United States Patent Office 3,509,224
Patented Apr. 28, 1970

3,509,224
METHOD FOR MANUFACTURING PENTACYCLO [8.2.1.1$^{4,7}$.0$^{2,9}$.0$^{3,8}$] TETRADECA-5,11-DIENES
Edward A. Rick and Roy L. Pruett, Charleston, W. Va., assignors to Union Carbide Corporation, a corporation of New York
No Drawing. Original application Aug. 22, 1966, Ser. No. 573,833, now Patent No. 3,458,550, dated July 29, 1969. Divided and this application May 6, 1969, Ser. No. 822,305
Int. Cl. C07c *13/00*
U.S. Cl. 260—666                    10 Claims

ABSTRACT OF THE DISCLOSURE

Compounds of the formula Ni[CN]$_2$XR$_n$P[OR']$_{3-n}$ are prepared by reacting Ni[CN]$_2$ and a phosphorous ester R$_n$P[OR']$_{3-n}$ in an alcohol R'OH where $x=2$ or 3, $n=0$, 1 or 2, R and R' are alkyl, cycloalkyl, alkylcycloalkyl, cycloalkylalkyl, aryl, aralkyl, alkaryl and which may be the same or different. A redistribution reaction is observed where R and R' are different. Both tetra and pentacoordinate nickel complexes may be prepared in this manner.

The complexes are used to dimerize bicycloheptadiene to pentacyclo[8.2.1.1$^{4,7}$.0$^{2,9}$.0$^{3,8}$]tetradeca-5,11-dienes.

---

The present application is a divisional application of U.S. patent application Ser. No. 573,833 filed Aug. 22, 1966 and now Patent No. 3,458,550, issued July 29, 1969.

The present invention relates to a novel composition of matter comprising tetracoordinate Ni(II) organo-metallic complexes. This invention also relates to pentacoordinate Ni(II) organo-metallic complexes having only monodentate ligands, said pentacoordinate complexes remaining substantially undissociated in solution. Additionally this invention relates to manufacturing such compositions and in one embodiment a redistribution reaction is employed to this end. The compositions thus obtained can be used as catalysts for the dimerization of bicycloheptadiene, especially to either the exo, trans, exo and/or the exo, trans, endo and/or the endo, trans, endo configuration.

Nickel (O) organo-metallic compounds are known in the art as dimerization catalysts however suffer the disadvantage that they are generally prepared from highly toxic Ni(CO)$_4$ by replacement of all or some of the ligands or by the reactions of nickel chelates with highly pyrophoric alkyl aluminum compounds which are also hazardous.

The dimerization of bicycloheptadiene to pentacyclo-[8.2.1.1$^{4,7}$.0$^{2,9}$.0$^{3,8}$] tetradeca-5,11-diene (referred to hereafter as "bicycloheptadiene dimer" or "dimer") is known but the dimerization products are solid or semi-solid compounds composed largely of the exo-trans-exo-isomer when using some Ni(O) catalysts. The exo-trans-endo-isomer however is a particularly desirable product since it is liquid and more easily handled in large scale operations involving further reaction of the dimers.

For the purpose of the present invention three of the isomers of bicycloheptadiene dimer are identified below.

  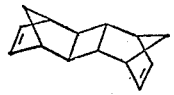  

exo-trans-exo          exo-trans-endo          endo-trans-endo
m.p. 67–68° C.         liquid.                 m.p. 92–93° C.

It is therefore an object to overcome these and other disadvantages encountered in the prior art.

These and other objects have been achieved by the present invention which comprises the discovery of novel Ni(II) tetracoordinate and pentacoordinate nickel complexes of the following formula:

(I)              Ni[CN]$_2$·$x$R$n$P[OR']$_{3-n}$ where $x=2$ or 3, $n=0$, 1 or 2 and R and R' are alkyl, cycloalkyl, alkylcycloalkyl, cycloalkylalkyl, aryl, aralkyl, alkaryl, and may be the same or different; preferably R and R' are 1–12, especially 1–8 carbon atom alkyl, 5–12 especially 5–8 carbon atom cycloalkyl; 6–18 especially 6–10 carbon atom alkylcycloalkyl, 6–18 especially 6–10 carbon atom cycloalkylalkyl, 6–14 especially 6–10 carbon atom aryl, 7–20 especially 7–16 carbon atom alkaryl and 7–20 especially 7–16 carbon atom aralkyl where R and R' may be the same or different.

Illustrative examples of the novel complexes,

Ni[CN]$_2$·XR$n$P[OR']$_{3-n}$ wherein R, R' and n are as defined above and X is 2 or 3, include Ni[CN]$_2$·XP[OC$_2$H$_5$]$_3$ Ni[CN]$_2$·XP[OC$_6$H$_5$]$_3$ Ni[CN]$_2$·XP[OC$_6$H$_5$][OC$_4$H$_9$]$_2$ Ni[CN]$_2$·2[C$_6$H$_5$]$_2$POC$_2$H$_5$ Ni[CN]$_2$·2[C$_6$H$_5$]$_2$POCH$_3$ Ni[CN]$_2$·2[C$_3$H$_7$]$_2$POC$_2$H$_5$ Ni[CN]$_2$·2[CH$_3$][C$_6$H$_5$]POC$_2$H$_5$ Ni[CN]$_2$·2[C$_6$H$_5$]$_2$POi—C$_3$H$_7$ Ni[CN]$_2$·2[C$_6$H$_5$]$_2$P[OCH$_2$C$_6$H$_5$]

Ni[CN]$_2$·3[C$_6$H$_5$]P[OC$_2$H$_5$]$_2$

Ni[CN]$_2$·3[C$_6$H$_5$]P[OCH$_3$]$_2$

Ni[CN]$_2$·3[p-CH$_3$C$_6$H$_4$]P[OC$_2$H$_5$]$_2$

Ni[CN]$_2$·3[mesityl]P[OC$_2$H$_5$]$_2$

In the above formulae CH$_3$ refers to methyl, C$_2$H$_5$ refers to ethyl, C$_6$H$_5$ refers to phenyl, C$_4$H$_9$ refers to butyl and isobutyl, C$_3$H$_7$ refers to propyl, i—C$_3$H$_7$ refers to isopropyl, CH$_2$C$_6$H$_5$ refers to a benzyl moiety and p—CH$_3$C$_6$H$_4$ refers to a para-tolyl moiety.

The novel Ni(II) organometallic compositions may be prepared according to the following reaction.

(II)
Ni[CN]$_2$ + R$n$P[OR]$_{3-n}$ $\xrightarrow{\text{R'OH}}$ Ni[CN]$_2$·XR$n$[POR']$_{3-n}$ where R, R', X and n have been defined above. In a preferred embodiment of the invention, R'OH is an alkanol.

In another aspect of this invention the novel nickel compounds may be prepared by a "redistribution reaction" [after the terminology of G. Calinquert and H. Beatty J.A.C.S., vol. 61, p. 2749 (1939)] as illustrated above in Formula II. Thus it has been discovered that by reacting Ni[CN]$_2$ and the phosphorous ester in an alcohol R'OH to form the nickel compounds, the R' radical of the alcohol will exchange with the radical R of the phosphorous ester organo-oxy moiety when R and R' are different. As an example, an ethanolic slurry of nickel cyanide refluxed at atmospheric pressure with excess phenyl diphenyl phosphinite, [C$_6$H$_5$]$_2$POC$_6$H$_5$ will yield Ni[CN]$_2$·2[C$_6$H$_5$]$_2$POC$_2$H$_5$. This exchange reaction permits the preparation of a whole series of complexes of the type Ni[CN]$_2$·XR$_n$P[OR']$_{3-n}$ merely by changing the alcohol employed as solvent.

The novel complexes may be prepared by treating an alcoholic slurry of nickel (II) cyanide with the appropriate phosphorus-containing ester of the type R$_n$P(OR')$_{3-n}$ wherein R, R' and n are as previously described, for a period of time sufficient to permit formation of the complex. The best temperature for complex formation varies with the nature of the phosphorus-containing ester employed and may be anywhere from room temperature or below to about 250° C. or above, for example from about 5° C. to about 250° C. especially about 20° C. to about 150° C.

The following are illustrative examples of the phosphorus-containing esters that combine with nickel (II) cyanide to form novel complexes.

Phosphorous acid triesters (P[OR]$_3$) such as trimethyl phosphite, triethyl phosphite, tripropyl phosphite, tributyl phosphite, triisopropyl phosphite, triisobutyl phosphite, triisoamyl phosphite, diphenyl propyl phosphite, diphenyl butyl phosphite, dibutyl phenyl phosphite, triphenyl phosphite, tri-o-tolyl phosphite, tri-1-anthryl phosphite and the like; phosphonous acid diesters (RP[OR]$_2$) such as dimethyl phenylphosphonite, diethyl phenylphosphonite, di-isopropyl phenylphosphonite, diethyl p-tolylphosphonite, diethyl mesitylphosphonite, diphenyl phenylphosphonite and the like; phosphinous acid esters $$(R_2POR)$$

such as ethyl methylethylphosphinite, ethyl diethylphosphinite, ethyl dipropylphosphinite, ethyl dibutylphosphinite, ethyl methylphenylphosphinite, methyl diphenylphosphinite, ethyl diphenylphosphinite, isopropyl diphenylphosphinite, isobutyl diphenylphosphinite, benzyl diphenylphosphinite, phenyl diphenylphosphinite and the like.

The ratio of nickel (II) cyanide to phosphorous-containing ester is not critical. These two ingredients may be employed in stoichiometric amounts or either one may be employed in excess.

In the preparation of some of the organo-metallic compounds of the invention, the products obtained may be identified in terms of the process employed in their manufacture. Thus, nickel cyanide may be reacted with triethyl phosphite in ethanol to obtain a product characterized by this process. Nickel cyanide, triphenyl phosphite and phenol as well as nickel cyanide, tricyclohexyl phosphite and cyclohexanol may also be reacted in a similar fashion to obtain products best described in terms of the process employed for their synthesis. These complexes may also be used to form the dimers of the present invention.

There is also evidence that certain tetracoordinate complexes such as Ni[CN]$_2$·2[C$_6$H$_5$]$_2$POC$_3$H$_7$ are converted to the pentacoordinate species $$(e.g.\ Ni[CN]_2 \cdot 3[C_6H_5]_2POC_3H_7)$$

in solutions containing an excess of the phosphorous containing esters (e.g. [C$_6$H$_5$]$_2$POC$_3$H$_7$). The complex prepared in this manner has not however been isolated from solution as a solid even though the solution exhibits characteristics indicative of pentacoordinate complex formation.

Otherwise, the nickel cyanide complexes may be isolated from the reaction mixture by any one of a number of conventional techniques. If, for example, the resulting complex is quite soluble in the alcoholic solvent employed, then any unreacted nickel cyanide can be removed by filtration and complex can be recovered from the alcoholic solvent by crystallization from the solvent or by removal of solvent by distillation. If, on the other hand, the complex is largely insoluble in the solvent used, isolation may be accomplished simply by filtration.

It is known in the prior art that nickel cyanide-triarylphosphine complexes may be obtained by heating an ethanolic slurry of nickel cyanide with triphenyl phosphine (G. N. Schrauzer and P. Glockner, Berichte, vol. 97 p. 2451 (1964) Schrauzer, Ger. Patent 1,163,814 (Sept. 10, 1964)). The compound obtained by this method may be represented by the formula:

$$Ni[CN]_2 \cdot 2P[C_6H_5]_3$$

It was therefore totally unexpected, prior to the present invention, to react nickel cyanide with a phosphorous-containing ester in an alcohol and obtain a product by means of a redistribution reaction with the alcoholic solvent. It was also unexpected that the pentacoordinate complex or the tetracoordinate type could be obtained by the expedient of employing a phosphorous-containing ester in this reaction.

It has also been discovered in another embodiment of this invention that complexes of the type $$Ni[CN]_2 \cdot XR_nP[OR']_{3-n}$$

wherein R, R', $n$ and X are as described above are catalysts for the dimerization of bicycloheptadiene.

The preferred catalysts are those of the type $$Ni[CN]_2 \cdot 2Ar_2POR'$$

and Ni[CN]$_2$·3ArP[OR']$_2$ wherein Ar is a 6–16 carbon atom aryl or alkaryl and R' is a 1–12 carbon atom alkyl, a 5–12 carbon atom cycloalkyl, a 6–18 carbon atom alkylcycloalkyl, a 6–18 carbon atom cycloalkylalkyl, a 6–18 carbon atom aryl, a 7–16 carbon atom alkaryl or a 7–16 carbon aralkyl. The most preferred catalysts however are those of the type Ni[CN]$_2$·2Ar$_2$POR' wherein Ar and R' are as described above.

The dimerization is carried out by contacting the bicycloheptadiene with the nickel complex at a temperature sufficiently high to promote the reaction. The ideal temperature and the ideal reaction time are dependent upon the nature of the particular complex used. Typically, reaction temperatures of about 50° C. to about 250° C. can be employed. Reaction times of from about a few minutes to about twenty-four hours have been employed.

The amount of complex employed as catalyst may be anywhere from about 0.001 to about 10 percent, preferably about 0.1 to 3 percent, by weight of the bicycloheptadiene charged.

The reaction may be carried out in an inert solvent (e.g. hexane, tetrahydrofuran, dioxane) or it may be carried out in the absence of a solvent. Inert solvents are those which are not affected by the catalyst and do not alter the course of the reaction. Atmospheric pressure, sub-atmospheric pressures or super-atmospheric pressures may be employed. The process also lends itself to either batch or continuous operations.

The product is easily isolated by conventional techniques. A simple distillation of the crude reaction mixture, for example allows isolation of the dimer in a high degree of purity.

Typically, the use of these novel complexes as catalysts for the dimerization of bicycloheptadiene gives a product which is an isomeric mixture of pentacyclo $$[8.2.1.1^{4.7}.0^{2.9}.0^{3.8}]$$

tetradeca-5,11-dienes. Of the six possible isomers one might expect to be present, only three are found in appreciable quantities. These are the exo, trans, exo-isomer, the exo, trans, endo-isomer and the endo, trans, endo-isomer.

The following non-limiting examples are given as illustrations of the various ways in which the present invention may be practiced.

EXAMPLE 1

Anhydous nickel cyanide (0.10 mole), [C$_6$H$_5$]$_2$POC$_6$H$_5$ phenyl diphenylphosphinite (0.20 mole) and ethanol (1000 ml.) are charged to a flask under a nitrogen atmosphere, and the mixing refluxed 24 hours. The reaction mixture is filtered while hot, and the filtrate cooled to precipitate the complex. There is thus obtained a 70.8 percent yield of Ni[CN]$_2$·2[C$_6$H$_5$]$_2$POC$_2$H$_5$. Recrystallization from ethanol afforded an analytically pure sample.

Calc'd for Ni[CN]$_2$·[C$_6$H$_5$]$_2$POC$_2$H$_5$ (percent): C, 63.08; H, 5.29; N, 4.90; Ni, 10.28; P, 10.85. Found (percent): C, 62.85; H, 5.40; N, 4.85 Ni, 10.42; P, 10.68.

EXAMPLE 2

Anhydrous nickel cyanide (0.12 mole), $[C_6H_5]_2POC_2H_5$ ethyl dihenylphosphinite (0.24 mole) and ethanol (1200 ml.) are charged to a flask under a nitrogen atmosphere, and the mixture refluxed 3.5 hours. The reaction mixture is filtered while hot, and the filtrate cooled to precipitate the yellow $Ni[CN]_2 \cdot 2[C_6H_5]_2POC_2H_6$. There is thus obtained a 73.8 percent yield of the complex.

EXAMPLE 3

Anhydrous nickel cyanide (0.12 mole),

[C H_5]PO$n$—C_3H_7 n-propyl diphenylphosphinite (0.24 mole) and n-propanol (1200 ml.) are charged to a flask under a nitrogen atmosphere, and the mixture refluxed for 25 hours. The reaction mixture is filtered while hot. Subsequent cooling of the filtrate fails to precipitate any of the complex. The filtrate is evaporated to dryness. The residue (66 g.) disslowed in benzene (250 ml.), and the complex precipitated from solution by addition of hexane (3000 ml.). There is thus obtained a 68 percent yield of the yellow $Ni[CN]_2 \cdot 2[C_6H_5]_2POn$—$C_3H_7$. An analytical sample is prepared by recrystallization from methyl ethyl ketone; M.P. 136–137° C.

Calc'd for $Ni[CN]_2 \cdot 2[C_6H_5]_2POn$—$C_3H_7$ (percent): C, 64.13; H, 5.72; N, 4.67; Ni, 9.80; P, 10.34; M.W., 500. Found (percent): C, 63.70; H, 5.87; N, 5.10; Ni, 9.80; P, 10.40; M.W. 592±3.

EXAMPLE 4

Anhydrous nickel cyanide (0.12 mole), $[C_6H_5]_2POn$—$C_4H_9$ n-butyl diphenylphosphinite (0.24 mole) and n-butanol (1200 ml.) are charged to a flask under a nitrogen atmosphere, and the mixture refluxed for 11 hours. The reaction mixture is filtered while hot. Subsequent cooling of the filtrate failed to precipitate any of the complex. The filtrate is evaporated to dryness, the residue (73 g.) dissolved in benzene (115 ml.), and the complex precipitated from solution by the addition of hexane (3000 ml.). There is then obtained 54 grams (72% of theoretical for $Ni[CN]_2 \cdot 2[C_6H_5]_2POn$—$C_4H_9$) or orange-colored complex.

EXAMPLE 5

Anhydrous nickel cyanide (0.10 mole), $P[OC_2H]_3$ triethyl phosphite (0.20 mole) and ethanol (500 ml.) are charge to a flask under a nitrogen atmosphere, and the mixture refluxed for 2.25 hours. The reaction mixture is filtered while hot and then the solvent removed under vacuum. The residue is dissolved in refluxing hexane. The hexane solution is filtered and then cooled to −80° C. to precipitate the complex as a dark red oil. This is separated from the hexane by decantation and the complex warmed under vacuum to remove the final traces of hexane. There is thus obtained 20 grams of a nickel cyanide-triethyl phosphite complex.

EXAMPLE 6

Anhydrous nickel cyanide (0.12 mole), $C_6H_5P(OC_2H_5)_2$ diethyl phenylphosphonite (0.24 mole) and ethanol (1200 ml.) are charged to a flask under a nitrogen atmosphere, and the mixture refluxed for 3¼ hours. The reaction mixture is filtered while hot. Subsequent cooling of the filtrate failed to precipitate any of the complex. The filtrate is evaporated to dryness and the residue (54 g.) a dark red oily solid, recrystallized from hexane. There is thus obtained a 57 percent yield of the orange, crystalline $Ni[CN]_2 \cdot 3C_6H_5P[OC_2H_5]_2$

M.P. 105° C.

Calc'd for $Ni[CN]_2 \cdot 3C_6H_5P[OC_2H_5]_2$ (percent): C, 54.54; H, 6.43; N, 3.97; Ni, 8.33; P, 13.09; M.W., 704.7. Found (percent): C, 54.87; H, 7.00; N, 4.12; Ni, 8.62; P, 13.28; M.W., 690±3.

EXAMPLE 7

Anhydrous nickel cyanide (0.12 mole), $C_6H_5P[OCH_3]_2$ dimethyl phenyl phosphonite (0.36 mole) and methanol (1200 ml.) were charged to a flask under a nitrogen atmosphere, and the mixture refluxed for four hours. The reaction mixture is filtered while hot and the filtrate evaporated to dryness. There is thus obtained a 98 percent yield of the crude $Ni[CN]_2 \cdot 3C_6H_5P[OCH_3]_2$. This is purified by dissolving in $CCl_4$ and reprecipitating with hexane. The yellow-orange complex thus obtained melts at 137–138° C.

Calc'd for $Ni[CN]_2 \cdot 3C_6H_5P[OCH_3]_2$ (percent): C, 50.27; H, 5.34; N, 4.51; Ni, 9.45; P, 14.96. Found (percent): C, 49.43; H, 5.46; N, 4.49; N, 9.38; P, 14.67.

EXAMPLE 8

Bicycloheptadiene (3000 g.) and $Ni[CN]_2 \cdot 2[C_6H_5]_2POn$—$C_3H_7$ (30 g.) of Example 3 are charged to a flask under a nitrogen atmosphere and heated to reflux. As the reaction progresses the temperature of the reaction mixture increases slowly from 90° C. to 150° C. after which it is maintained at 150° C. until analysis by vapor phase chromatography reveals that the reaction is essentially complete. Distillation of the reaction mixture gave bicycloheptadiene (23 g.) and bicycloheptadiene dimer (2552 g., 85.1 percent yield). Analysis of the dimer by vapor phase chromatography reveals that it contains 25.8 percent of the exo, trans, exo-isomer, 68.5 percent of the exo, trans, endo-isomer and 5.7 percent of the endo, trans, endo-isomer.

EXAMPLES 9–14

In a series of runs, bicycloheptadiene and catalyst are charged to heavy-walled glass tubes under an atmosphere of nitrogen. The tubes are sealed and then placed in a preheated bath for a number of hours. After removal from the bath, the tubes are opened and the crude products analyzed by vapor phase chromatography. The results of these runs are summarized in Table I below.

TABLE I

| Dimerization example | Catalyst of example | Catalyst (0.5 g.) | Bicycloheptadiene (gms.) | Reaction time (hrs.) | Reaction temp. (°C.) | Dimer/monomer in product mix | Percent Dimer | | |
|---|---|---|---|---|---|---|---|---|---|
| | | | | | | | Exo, trans, exo-isomer | Exo, trans, endo-isomer | Endo, trans, endo-isomer |
| 9 | 2 | Ni(CN)₂.2φ₂POC₂H₅ | 36 | 64 | 100 | 0.45 | 21.3 | 71.9 | 6.8 |
| 10 | 2 | Ni(CN)₂.2φ₂POC₂H₅ | 36 | 20 | 120 | 0.29 | 22.2 | 71.8 | 6.0 |
| 11 | 3 | Ni(CN)₂.2φ₂PO$n$—C₃H₇ | 45 | 20 | 100 | 11.5 | 32.4 | 63.8 | 3.8 |
| 12 | 4 | Ni(CN)₂.2φ₂PO$n$—C₄H₉ | 45 | 20 | 100 | 27.6 | 33.0 | 61.8 | 5.2 |
| 13 | 6 | Ni(CN)₂.3φP(OC₂H₅)₂ | 45 | 20 | 100 | 0.41 | 37.2 | 59.7 | 3.1 |
| 14 | 5 | | 45 | 20 | 100 | 0.29 | 49.1 | 47.7 | 3.2 |

The dimers of this invention may be used as heat exchange compounds, diluents for paint, varnish, lacquers, plastisols and organasols and may be polymerized by means of a Lewis acid to form solid polymers useful as molding compositions.

The dimers of this invention may also be converted to compounds of the structure:

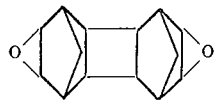

by treatment with an ethyl acetate solution of peracetic acid at 35° C. Dropwise addition of the acid is preferred because of the exothermic nature of the reaction. The epoxide thus produced may be employed as a resin intermediate for the production of epoxy resin molding, potting and encapsulating compositions. Curing agents well known in the art may be used in preparing the resin.

Although the invention has been described by reference to some exemplified embodiments, it is not intended that the scope of the nickel compound, catalyst, method for its manufacture and the production of bicycloheptadiene dimers be limited thereby but that certain modifications are intended to be included within the spirit and broad scope of the following claims.

What is claimed is:

1. A method for the manufacture of pentacyclo-[8.2.1.1$^{4,7}$.0$^{2,9}$.0$^{3,8}$]tetradeca-5,11-dienes comprising dimerizing bicyclo[2.2.1]hepta-2,5-diene in the presence of a catalyst comprising:

$$Ni[CN]_2 \cdot XR_nP[OR']_{3-n}$$

where R and R' are members selected from the group consisting of 1 to 12 carbon atom alkyl, 5 to 12 carbon atom cycloalkyl, 6 to 18 carbon atom alkylcycloalkyl, 6 to 18 carbon atom cycoalkylalkyl, 6 to 14 carbon atom aryl, 7 to 20 carbon atom aralkyl, and 7 to 20 carbon atom alkaryl, R and R' can be the same or different, $n$ is 0, 1 or 2 and X is 2 or 3.

2. The method of claim 1 for the manufacture of pentacyclo[8.2.1.1$^{4,7}$.0$^{2,9}$.0$^{3,8}$]tetradeca-5,11-dienes comprising dimerizing bicyclo[2.2.1]hepta-2,5-diene in the presence of a catalyst comprising:

$$Ni[CN]_2 \cdot XR_nP[OR']_{3-n}$$

where Ar is a member selected from the group consisting of 6 to 14 carbon atom aryl or 7 to 20 carbon atom alkaryl, R' is a member selected from the group consisting of 1 to 12 carbon atom alkyl, 5 to 12 carbon atom cycloalkyl, 6 to 18 carbon atom alkylcycloalkyl, 6 to 18 carbon atom cycloalkylalkyl, 6 to 14 carbon atom aryl, 7 to 20 carbon atom alkaryl, or 7 to 20 carbon atom aralkyl.

3. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 2Ar_2POR'$$

where Ar is a member selected from the group consisting of 6 to 14 carbon atom aryl or 7 to 2 carbon atom alkaryl, R' is a member selected from the group consisting of 1 to 12 carbon atom alkyl, 5 to 12 carbon atom cycloalkyl, 6 to 18 carbon atom alkylcycloalkyl, 6 to 18 carbon atom cycloalkylalkyl, 6 to 14 carbon atom aryl, 7 to 20 carbon atom alkaryl, or 7 to 20 carbon atom aralkyl.

4. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 3ArP[OR']_2$$

where Ar is a member selected from the group consisting of 6 to 14 carbon atom aryl or 7 to 20 carbon atom alkaryl, R' is a member selected from the group consisting of 1 to 12 carbon atom alkyl, 5 to 12 carbon atom cycloalkyl, 6 to 18 carbon atom alkylcloalkyl, 6 to 18 carbon atom cycloalkylalkyl, 6 to 14 carbon atom aryl, 7 to 20 carbon atom alkaryl, or 7 to 20 carbon atom aralkyl.

5. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 2[C_6H_5]_2POC_2H_5$$

6. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 2[C_6H_5]_2POn\text{---}C_3H_7$$

7. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 2[C_6H_5]_2POn\text{---}C_4H_9$$

8. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 3C_6H_5P[OC_2H_5]_2$$

9. The method of claim 1 for the manufacture of pentacyclo[8.2.1.1$^{4,7}$.0$^{2,9}$.0$^{3,8}$]tetradeca-5,11 - dienes comprising dimerizing bicyclo[2.2.1]hepta-2,5-diene in the presence of a catalyst comprising:

$$Ni[CN]_2 \cdot 3C_6H_5P[OCH_3]_2$$

10. The method of claim 1 for the manufacture of pentacyclo[8.2.1.1$^{4,7}$.0$^{2,9}$.0$^{3,8}$]tetradeca-5,11 - dienes comprising reacting nickel cyanide and triethyl phosphite to obtain an organometallic complex and dimerizing bicyclo[2.2.1]hepta-2,5-diene with said complex.

References Cited

UNITED STATES PATENTS

| | | | |
|---|---|---|---|
| 3,458,550 | 7/1969 | Rick et al. | 260—666 |
| 3,441,294 | 4/1969 | Pruett | 260—666 |
| 3,326,993 | 6/1967 | Bastian | 260—666 |
| 3,258,501 | 6/1966 | Cannell | 260—666 |

DELBERT E. GANTZ, Primary Examiner

V. O'KEEFE, Assistant Examiner

UNITED STATES PATENT OFFICE
CERTIFICATE OF CORRECTION

Patent No. 3,509,224                          April 28, 1970

Edward A. Rick et al.

It is certified that error appears in the above identified patent and that said Letters Patent are hereby corrected as shown below:

Claim 2, line 5, "$R_n$" should read -- $A_r$ --.

Signed and sealed this 22nd day of September 1970.

(SEAL)
Attest:

Edward M. Fletcher, Jr.                   WILLIAM E. SCHUYLER, JR.
Attesting Officer                            Commissioner of Patents